United States Patent
Tsai

(10) Patent No.: US 11,582,014 B2
(45) Date of Patent: Feb. 14, 2023

(54) COMMUNICATION METHOD AND USER EQUIPMENT OF PERFORMING BANDWIDTH PART SWITCHING BETWEEN A NON-DORMANT BANDWIDTH PART AND A DORMANT BANDWIDTH PART

(71) Applicant: FG Innovation Company Limited, Tuen Mun (HK)

(72) Inventor: Hsin-Hsi Tsai, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 48 days.

(21) Appl. No.: 17/113,800

(22) Filed: Dec. 7, 2020

(65) Prior Publication Data

US 2021/0176030 A1   Jun. 10, 2021

Related U.S. Application Data

(60) Provisional application No. 62/945,005, filed on Dec. 6, 2019.

(51) Int. Cl.
*H04L 5/00* (2006.01)
*H04W 74/08* (2009.01)
(Continued)

(52) U.S. Cl.
CPC ......... *H04L 5/0098* (2013.01); *H04B 7/0626* (2013.01); *H04L 5/0092* (2013.01);
(Continued)

(58) Field of Classification Search
CPC ... H04L 5/0098; H04L 5/0092; H04L 5/0055; H04L 5/0057; H04L 5/001; H04L 1/1854;
(Continued)

(56) References Cited

U.S. PATENT DOCUMENTS

2021/0021397 A1\*  1/2021  Kim ..................... H04L 1/1854
2021/0203468 A1\*  7/2021  Yi ........................... H04L 5/001
2021/0352580 A1\* 11/2021  Zhou ................. H04W 52/0209

OTHER PUBLICATIONS

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN) Dverall description; Stage 2 (Release 15)", Technical Specification, V15.4.0 (Dec. 2018).

(Continued)

*Primary Examiner* — Kiet Tang
(74) *Attorney, Agent, or Firm* — ScienBiziP, P.C.

(57) ABSTRACT

A communication method of performing Bandwidth Part (BWP) switching between a non-dormant BWP and a dormant BWP is provided. The communication method is performed by a UE configured by a Base Station (BS) with a serving cell and a dormancy group to which the serving cell belongs. The communication method includes activating the non-dormant BWP as an activated BWP for the serving cell; initializing a first Random Access (RA) procedure on the serving cell; receiving, from the BS, one of a first indication for BWP switching for the serving cell and a second indication for BWP switching for the dormancy group while the first RA procedure is ongoing; switching the activated BWP for the serving cell, based on one of the first indication and the second indication, from the non-dormant BWP to the dormant BWP; and stopping the first RA procedure after receiving one of the first indication and the second indication.

18 Claims, 7 Drawing Sheets

(51) Int. Cl.
  *H04W 72/0453* (2023.01)
  *H04B 7/06* (2006.01)
  *H04W 76/11* (2018.01)
  *H04W 76/27* (2018.01)
  *H04W 72/04* (2023.01)
(52) U.S. Cl.
  CPC ..... *H04W 72/042* (2013.01); *H04W 72/0453* (2013.01); *H04W 74/0833* (2013.01); *H04W 76/11* (2018.02); *H04W 76/27* (2018.02)
(58) Field of Classification Search
  CPC .. H04L 5/0096; H04B 7/0626; H04W 72/042; H04W 72/0453; H04W 74/0833; H04W 76/11; H04W 76/27; H04W 76/10
  See application file for complete search history.

(56) References Cited

OTHER PUBLICATIONS

3GPP TS 36.321, "3rd Generation Partnership Project; Technical Specification Group Radio Access Network; Evolved Universal Terrestrial Radio Access (E-UTRA); Medium Access Control (MAC) protocol specification (Release 15)", Technical Specification, V15.4.0 (Dec. 2018).

3GPP TS 36.321, "3rd Generation Partnership Project; Technical Specification Group Radio Access Network; Evolved Universal Terrestrial Radio Access (E-UTRA); Medium Access Control (MAC) protocol specification (Release 15)", Technical Specification, V15.7.0 (Sep. 2019).

3GPP TS 38.133, "3rd Generation Partnership Project; Technical Specification Group Radio Access Network; NR Requirements for support of radio resource management (Release 15)", Technical Specification, V15.5.0 (Mar. 2019).

3GPP TS 38.300, "3rd Generation Partnership Project; Technical Specification Group Radio Access Network; Nr; Nr and NG-RAN Overall Description; Stage 2 (Release 15)", Technical Specification, V15.7.0 (Sep. 2019).

3GPP TS 38.331, "3rd Generation Partnership Project; Technical Specification Group Radio Access Network; NR Radio Resource Control (RRC) protocol specification (Release 15)", Technical Specification, V15.7.0 (Sep. 2019).

\* cited by examiner

_US 11,582,014 B2_

1

COMMUNICATION METHOD AND USER EQUIPMENT OF PERFORMING BANDWIDTH PART SWITCHING BETWEEN A NON-DORMANT BANDWIDTH PART AND A DORMANT BANDWIDTH PART

CROSS-REFERENCE TO RELATED APPLICATION(S)

The present disclosure claims the benefit of and priority to provisional U.S. Patent Application Ser. No. 62/945,005 ("the '005 provisional"), filed on Dec. 6, 2019, entitled "Method and Apparatus for Activation of Dormant Bandwidth Part." The content(s) of the '005 provisional are fully incorporated herein by reference for all purposes.

FIELD

The present disclosure is generally related to wireless communications and, specifically, to a communication method and a User Equipment (UE) of performing Bandwidth Part (BWP) switching between a non-dormant BWP and a dormant BWP.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a communication method and a UE of performing Bandwidth Part (BWP) switching between a non-dormant BWP and a dormant BWP.

According to an aspect of the present disclosure, a communication method of performing Bandwidth Part (BWP) switching between a non-dormant BWP and a dormant BWP is provided. The communication method is performed by a UE configured by a Base Station (BS) with a serving cell and a dormancy group to which the serving cell belongs. The communication method includes activating the non-dormant BWP as an activated BWP for the serving cell; initializing a first Random Access (RA) procedure on the serving cell; receiving, from the BS, one of a first indication for BWP switching for the serving cell and a second indication for BWP switching for the dormancy group while the first RA procedure is ongoing; switching the activated BWP for the serving cell, based on one of the first indication and the second indication, from the non-dormant BWP to the dormant BWP; and stopping the first RA procedure after receiving one of the first indication and the second indication.

According to another aspect of the present disclosure, a UE of performing Bandwidth Part (BWP) switching between a non-dormant BWP and a dormant BWP is provided, where the UE is configured by a Base Station (BS) with a serving cell and a dormancy group to which the serving cell belongs. The UE includes a processor and a memory coupled to the processor. The memory stores at least one computer-executable program that, when executed by the processor, causes the processor to activate the non-dormant BWP as an activated BWP for the serving cell; initialize a first RA procedure on the serving cell; receive, from the BS, one of a first indication for BWP switching for the serving cell and a second indication for BWP switching for the dormancy group while the first RA procedure is ongoing; switch the activated BWP for the serving cell, based on one of the first indication and the second indication, from the non-dormant BWP to the dormant BWP; and stop the first RA procedure after receiving one of the first indication and the second indication.

BRIEF DESCRIPTION OF THE DRAWINGS

Aspects of the present disclosure are best understood from the subsequent detailed disclosure when read with the accompanying figures. Various features are not drawn to scale. Dimensions of various features may be arbitrarily increased or reduced for clarity of discussion.

DESCRIPTION

Figure 1:
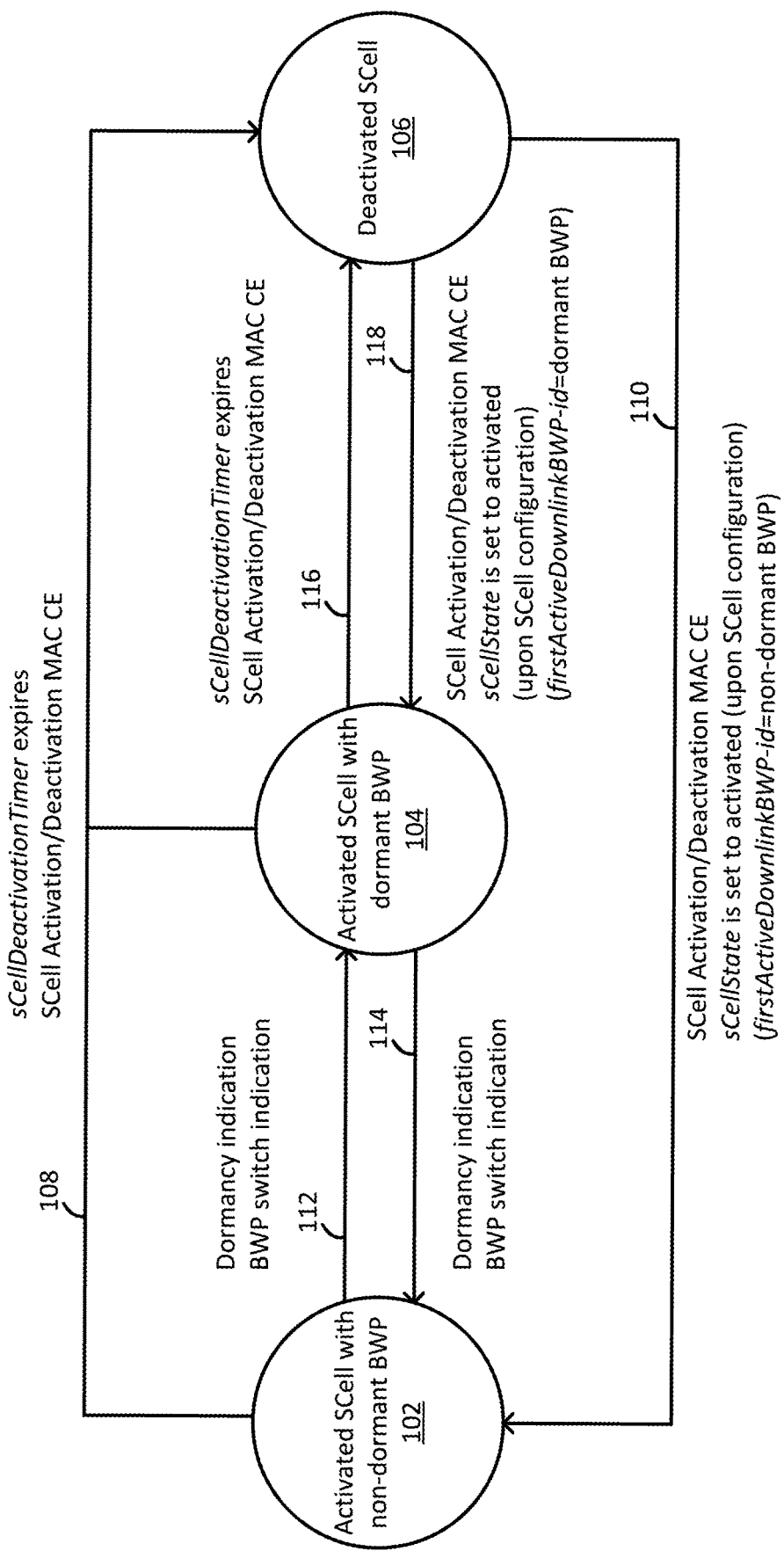
FIG. 1 illustrates state/status transition of a BWP/Secondary Cell (SCell), according to an implementation of the present disclosure.

The acronyms used in the present disclosure are defined as follows. Unless otherwise specified, the acronyms have the following meanings.

| Acronym | Full name |
| --- | --- |
| 3GPP | $3^{rd}$ Generation Partnership Project |
| 5G | $5^{th}$ Generation |
| 5GC | $5^{th}$ Generation Core |

| Acronym | Full name |
| --- | --- |
| ACK | Acknowledgment |
| BFI | Beam Failure Indication |
| BFR | Beam Failure Recovery |
| BS | Base Station |
| BSR | Buffer Status Report |
| BWP | Band Width Part |
| CA | Carrier Aggregation |
| CC | Component Carrier |
| C-DRX | Connected DRX |
| CE | Control Element |
| CG | Cell Group |
| CQI | Channel Quality Indication |
| CORESET | Control Resource Set |
| CSI | Channel State Information |
| DCI | Downlink Control Information |
| DL | Downlink |
| DRX | Discontinuous Reception |
| E-UTRAN | Evolved Universal Terrestrial Radio Access Network |
| EPC | Evolved Packet Core |
| HARQ | Hybrid Automatic Repeat Request |
| ID | Identity |
| IE | Information Element |
| LBT | Listen Before Talk |
| LTE | Long Term Evolution |
| MAC | Medium Access Control |
| MCG | Master Cell Group |
| MIMO | Multi-input Multi-output |
| MN | Master Node |
| NAS | Non-Access Stratum |
| NE-DC | N-E-UTRA Dual Connectivity |
| NR | New RAT/Radio |
| NR-U | New Radio Unlicensed |
| NW | Network |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PHY | Physical |
| PSCell | Primary Secondary Cell |
| PS-RNTI | Power Saving Radio Network Temporary Identity |
| PSS | Power Saving Signal |
| PUCCH | Physical Uplink Control Channel |
| PUSCH | Physical Uplink Shared Channel |
| RA | Random Access |
| RAN | Radio Access Network |
| RAR | Random Access Response |
| RF | Radio Frequency |
| RLC | Radio Link Control |
| RNTI | Radio Network Temporary Identity |
| RRC | Radio Resource Control |
| SCell | Secondary Cell |
| SCH | Shared Channel |
| SCG | Secondary Cell Group |
| SCS | Subcarrier Spacing |
| SDAP | Service Data Adaptation Protocol |
| SpCell | Special Cell |
| SR | Scheduling Request |
| SRS | Sounding Reference Signal |
| TA | Timing Alignment |
| TAI | Tracking Area Identifier |
| TB | Transport Block |
| TDD | Time Division Duplex |
| TR | Technical Report |
| TRP | Transmission/Reception Point |
| TS | Technical Specification |
| TX | Transmission |
| UE | User Equipment |
| UL | Uplink |
| UL-SCH | Uplink Shared Channel |
| WG | Working Group |
| WI | Working Item |
| WUS | Wake Up Signaling |

The following contains specific information related to implementations of the present disclosure. The figures and their accompanying detailed disclosure are directed to merely example implementations of the present disclosure. However, the present disclosure is not limited to merely these implementations. Other variations and implementations of the present disclosure will occur to those skilled in the art. Unless noted otherwise, like or corresponding elements among the figures may be indicated by like or corresponding reference numerals. Moreover, the figures and illustrations of the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

A UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As disclosed previously, the frame structure for NR supports flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

In a transmission time interval of a single NR frame, at least DL transmission data, a guard period, and UL transmission data should be included, where the respective portions of the DL transmission data, the guard period, the UL transmission data should also be configurable, for example, based on the network dynamics of NR. An SL resource may also be provided in an NR frame to support ProSe services.

In LTE, when CA is configured, the UE may only have one RRC connection with the network. During the RRC connection establishment/re-establishment/handover, a serving cell may provide NAS mobility information (e.g., TAI); during the RRC connection establishment/re-establishment/handover, the serving cell may provide the security input. The serving cell may be a PCell. Depending on UE capabilities, SCells may be configured to form together with the PCell a set of serving cells. Therefore, the configured set of serving cells for a UE may always include one PCell and one or more SCells. An SCell may be configured to start in a deactivated mode, a dormant mode, or an activated mode. Unlike SCells, the PCell cannot be deactivated and cannot operate in the SCell dormant mode.

To enable reasonable UE battery consumption when CA is configured, an activation/deactivation mechanism of SCells may be applied (but the activation/deactivation mechanism may not apply to the PCell). When an SCell is deactivated, the UE does not need to receive the corresponding PDCCH or PDSCH, does not perform transmission in the corresponding UL, and does not need to perform CQI measurements. When an SCell is activated (active), the UE may receive PDSCH and/or PDCCH (e.g., if the UE is configured to monitor PDCCH from this SCell) and is expected to be able to perform CQI measurements. To enable faster CQI reporting, a temporary CQI reporting period (which may be referred to a short CQI period) may be used during an SCell activation period. The activation/deactivation mechanism may be achieved based on MAC CE signaling and/or deactivation timer(s). The MAC CE (e.g., an SCell Activation/Deactivation MAC CE) may include a bitmap for the activation and deactivation of SCells. Each bit in the bitmap may correspond to an SCell. For example, a bit in the bitmap may be set to a first bit value (e.g., "1") to indicate the activation of the corresponding SCell, or set to a second bit value (e.g., "0") to indicate the deactivation of the corresponding SCell. With the bitmap, SCells may be activated and deactivated separately, and thus a subset of the SCells can be activated/deactivated by a single activation/deactivation command (e.g., an SCell Activation/Deactivation MAC CE). The deactivation timer (e.g., sCellDeactivationTimer) may be maintained per SCell basis. A common value for each deactivation timer of each SCell may be configured per UE basis by RRC.

In NR, a new type of BWP, which may be referred to as a dormant BWP, may be used to reduce the long activation delay of a serving cell. The dormancy mechanism in NR may be modeled by the dormant BWP. In other words, a BWP framework may be reused for transitioning between dormancy and non-dormancy. An SCell dormancy behavior/operation may be implemented at the UE by configuring the UE with a DL BWP with a CSI reporting configuration for the DL BWP but not configuring a PDCCH configuration for the DL BWP. Thus, when the DL BWP is activated, the UE may not monitor PDCCH, but may perform CSI measurements and/or CSI reporting for the DL BWP. The network may configure a dormant BWP ID to the UE via an RRC message. A UE may perform BWP switching to switch the active BWP of an SCell to a dormant BWP, for example, when receiving a BWP switch indication (e.g., via PDCCH or RRC (re-)configuration) or a dormancy indication (e.g., via DCI scrambled by PS-RNTI, via DCI with format 0_1, and/or via DCI with formant 1_1).

As disclosed previously, a UE may not perform PDCCH monitoring on a dormant BWP. This behavior may be achieved by, for example, configuring the UE with a BWP configuration with an absence of a PDCCH configuration (e.g., pdcch-Config). The dormant BWP may be configured for an SCell only when the SCell is configured with other configured BWP(s) (which may be referred to as a "non-dormant BWP"). There may be only one (configured) dormant BWP for an SCell.

A UE may identify the dormant BWP, for example based on the IE dormantBWP-Id, from the configured BWPs based on an RRC configuration. A non-dormant BWP may be configured by the network and activated, such as when receiving a BWP switch indication (e.g., via PDCCH or RRC (re-)configuration) or a dormancy indication (e.g., via DCI scrambled by PS-RNTI, via DCI with format 0_1, and/or via DCI with formant 1_1). Specifically, the BWP switch indication may be a specific indication that includes (but not limited to) BWP information (e.g., BWP index) for BWP switching. More specifically, the specific indication may further include other information for other purposes.

Characteristics and features of a dormant BWP and a non-dormant BWP are as follows:

Dormant BWP:

The UE may not monitor PDCCH and may continue to perform CSI measurements and/or CSI reporting for the dormant BWP.

The dormant BWP may not be configured with a configuration of PDCCH monitoring, such that the IE pdcch-Config may be absent in the BWP configuration of the dormant BWP.

For example, the BWP ID of the dormant BWP may be indicated by the IE dormantBWP-Id.

Non-Dormant BWP:

A BWP which is not a dormant BWP (or be configured with PDCCH monitoring) may be considered as a non-dormant BWP.

For example, the BWP ID of the non-dormant BWP may be different from the BWP ID indicated by the IE dormantBWP-Id.

The transition between a dormant BWP and a non-dormant BWP may rely on an L1-based mechanism, such as via L1 signaling (e.g., DCI), which may refer to a dormancy indication. The dormancy indication may be transmitted via different DCI formats depending on whether the UE is in the Active Time of DRX.

When the UE is in the Active Time, the dormancy indication may be sent on a PCell via a PDCCH which may be used for scheduling data.

The explicit information field in DCI may be a bitmap (appended to scheduling DCI) with up to X2 (e.g., 5) bits, and 1 bit per group of configured SCells (e.g., per dormancy group). Each dormancy group may have one or multiple SCells. Specifically, up to X2 SCells may be configured via RRC.

The DCI formats 0-1 and/or 1-1 may be used. The explicit information field in DCI may be a bitmap with 1 bit per configured SCell and/or per dormancy group.

When the UE is not in the Active Time, the dormancy indication may be sent on a PCell via a Power Saving Signal (PSS)/Power Saving Channel (e.g., DCI format 2_6). Specifically, the PSS may be scrambled by a specific RNTI (e.g., PS-RNTI).

The PSS may include a wake-up indication and/or a dormancy indication. For example, the dormancy indication may include a bitmap with up to X1 (e.g., 5) bits. Each bit in the bitmap may correspond to a group of configured SCells (e.g., dormancy group). Each dormancy group may have one or multiple SCells, where up to X1 SCell groups may be configured via RRC.

For the dormancy indication represented by a DCI field, a bitmap may be included. The bitmap may be set to a first bit value (e.g., "0") or a second bit value (e.g., "1").

If the bitmap is set to the first bit value (e.g., "0"), and if the UE is operating in a non-dormant BWP, the UE may switch to a dormant BWP (e.g., indicated by dormantBWP-Id).

If the bitmap is set to the first bit value (e.g., "0"), and if the UE is operating in a dormant BWP, the UE may stay in the dormant BWP.

If the bitmap is set to the second bit value (e.g., "1"), and if the UE is operating in a non-dormant BWP, the UE may stay in the non-dormant BWP.

If the bitmap is set to the second bit value (e.g., "1"), and if the UE is operating in a dormant BWP, the UE may switch to a specific non-dormant BWP explicitly configured by RRC (e.g., indicated by firstOutsideActiveTimeBWP-Id).

In NR, an SCell may operate in one of the following states/statuses:
1. The SCell is an activated SCell with an activated non-dormant BWP;
2. The SCell is an activated SCell with an activated dormant BWP; and
3. The SCell is a deactivated SCell.

The sCellDeactivationTimer may be used to transition the state/status of an SCell.

sCellDeactivationTimer (e.g., as specified in 3GPP TS 38.321 V15.7.0 and 3GPP TS 38.331 V15.7.0): the associated (activated) SCell (with activated non-dormant/dormant BWP) may be deactivated upon the expiry of the sCellDeactivationTimer. The sCellDeactivationTimer may be (re-)started if the associated SCell is activated. The sCellDeactivationTimer may be (re-)started if a PDCCH on the associated SCell indicates an UL grant or DL assignment, or if a PDCCH on the serving cell scheduling the associated SCell indicates an UL grant or a DL assignment for the associated SCell, or if a MAC PDU is transmitted in a configured UL grant or received in a configured DL assignment. If the sCellDeactivationTimer field is absent, the UE may consider the value of the sCellDeactivationTimer as "infinity." The time unit of the sCellDeactivationTimer may be configured as mini-slot, sub-slot, slot, symbol, frame, system frame, sub-millisecond, millisecond, or second.

FIG. 1 illustrates state/status transition of a BWP/SCell, according to an implementation of the present disclosure.

In state 102, the SCell is in the activated state with a non-dormant BWP.

In state 104, the SCell is in the activated state with a dormant BWP.

In state 106, the SCell is in the deactivated state.

In action 108, the activated SCell with the activated non-dormant BWP may transition to the deactivated state as the UE receives an SCell Activation/Deactivation MAC CE and/or the sCellDeactivationTimer expires. When the UE receives the SCell Activation/Deactivation MAC CE which indicates that the SCell is to be deactivated, the UE may deactivate the SCell or when an sCellDeactivationTimer associated with an SCell expires, the UE may deactivate the SCell.

In action 110, the deactivated SCell may transition to the activated SCell with the activated non-dormant BWP by an SCell Activation/Deactivation MAC CE or a RRC (re-)configuration. When the UE receives the SCell Activation/Deactivation MAC CE which indicates that the SCell is to be activated, the UE may activate the SCell. Specifically, the IE firstActiveDownlinkBWP-Id may be set to a non-dormant BWP. Which BWP should be activated when the SCell is activated may be configured in an IE denoted as firstActiveDownlinkBWP-Id (e.g., as specified in 3GPP TS 38.331 V15.7.0) and/or an IE denoted as firstActiveUplinkBWP (e.g., as specified in 3GPP TS 38.331 V15.7.0). When an SCell is configured, by the RRC (re-)configuration, with sCellState set to activated upon SCell configuration and firstActiveDownlinkBWP-Id is set to a non-dormant BWP, the UE may activate the SCell and activated the non-dormant BWP.

In action 112, the activated SCell with the activated non-dormant BWP may transition to the activated SCell with the activated dormant BWP in response to at least one of a BWP switch indication and a dormancy indication. The UE may receive a BWP switch indication which instructs the UE to switch a non-dormant BWP of an activated SCell to a dormant BWP. The UE may receive a dormancy indication which indicates to switch a non-dormant BWP of an activated SCell (or a group of SCells, such that the group may be a dormancy group, and activated SCell belongs to the dormancy group) to a dormant BWP.

In action 114, the activated SCell with activated dormant BWP may transition to the activated SCell with the activated non-dormant BWP by at least one of a BWP switch indication, and a dormancy indication. The UE may receive a BWP switch indication which indicates to switch a dormant BWP of an activated SCell to a non-dormant BWP. The UE may receive a dormancy indication which indicates to switch a dormant BWP of an activated SCell (or a group of SCells, such that the group may be a dormancy group, and activated SCell belongs to the dormancy group) to a non-dormant BWP.

In action 116, the activated SCell with activated dormant BWP may transition to the deactivated state by an SCell Activation/Deactivation MAC CE and/or an sCellDeactivationTimer. When the UE receives the SCell Activation/Deactivation MAC CE which indicates that the SCell is to be deactivated, the UE may deactivate the SCell. When an sCellDeactivationTimer associated with an SCell expires, the UE may deactivate the SCell.

In action 118, the deactivated SCell may transition to state the activated SCell with the activated dormant BWP by an SCell Activation/Deactivation MAC CE or a RRC (re-)configuration. When the UE receives the SCell Activation/Deactivation MAC CE which indicates the SCell to be activated, the UE may activate the SCell. Specifically, the IE firstActiveDownlinkBWP-Id may be set to a dormant BWP. Which BWP should be activated when the SCell is activated may be configured in the firstActiveDownlinkBWP-Id (e.g., as specified in 3GPP TS 38.331 V15.7.0) and/or the firstActiveUplinkBWP (e.g., as specified in 3GPP TS 38.331 V15.7.0). When an SCell is configured, by the RRC (re-)configuration, with sCellState set to activated upon SCell configuration, and firstActiveDownlinkBWP-Id is set to a dormant BWP, the UE may activate the SCell and activated the dormant BWP.

For each activated serving cell configured with a BWP(s), the UE may perform DL reception (e.g., monitoring on a PDCCH, reception on a DL-SCH, etc.) and/or perform UL transmission (e.g., transmission on an UL-SCH, transmission on a RACH, transmission on a PUCCH, reporting CSI, transmitting an SRS, etc.) on a BWP which is activated for the activated serving cell. If cross-carrier scheduling is applied, the UE may perform the, DL reception and/or UL transmission, scheduled by a first serving cell, for a BWP which is activated for a second serving cell.

If the activated BWP for the activated serving cell is a dormant BWP, the UE may not perform some DL reception (e.g., monitoring on a PDCCH, reception on a DL-SCH, etc.) and may not perform some UL transmission (e.g., transmission on an UL-SCH, transmission on a RACH, transmission on a PUCCH, etc.) on (or for) the dormant BWP. Since the UE may have different DL reception and/or UL transmission behaviors on a dormant BWP than on a non-dormant BWP, some UE behaviors may need to be performed when the activated BWP of the UE is switched to a dormant BWP from a non-dormant BWP.

An activated BWP may be referred to as an active BWP. The activated BWP and the active BWP are not uniformly named in the industry currently and are collectively referred to as the "activated BWP" subsequently in the present disclosure.

If the activated BWP of the activated SCell is a dormant BWP, the UE may:
not monitor the PDCCH on the dormant BWP;
not monitor the PDCCH for the dormant BWP;
not receive DL-SCH on the dormant BWP;
not transmit on UL-SCH on the dormant BWP;
not transmit on RACH on the dormant BWP;
not transmit SRS on the dormant BWP;
not transmit PUCCH on the dormant BWP;
perform periodic or semi-persistent CSI measurement for the dormant BWP, if configured;
clear any configured downlink assignment and any configured uplink grant Type 2 associated with the activated SCell;
suspend any configured uplink grant Type 1 associated with the activated SCell; or
perform beam failure detection and beam failure recovery for the activated SCell if beam failure is detected.

If the activated BWP of the activated SCell is a non-dormant BWP, the UE may:
transmit on an UL-SCH on the non-dormant BWP;
transmit on a RACH on the non-dormant BWP, if PRACH occasions are configured;
monitor the PDCCH on the non-dormant BWP;
transmit a PUCCH on the non-dormant BWP, if configured;
report CSI for the non-dormant BWP;
transmit an SRS on the non-dormant BWP, if configured; or
receive a DL-SCH on the non-dormant BWP.

BWP switching from Non-dormant BWP to Dormant BWP

A UE may perform one or more of the following operations(s) (e.g., Operation (1) to Operation (5)) if the activated BWP of a serving cell is switched from a non-dormant BWP to a dormant BWP.

A UE may perform one or more of the following operations(s) (e.g., Operation (1) to Operation (5)) if a BWP of a serving cell is activated, and the BWP is the dormant BWP.

A UE may perform one or more of the following operation(s) (e.g., Operation (1) to Operation (5)) when a UE receives a dormancy indication (in the (DRX) Active Time and/or outside the (DRX) Active Time) for a serving cell (and/or for a dormancy group of the serving cell), and the dormancy indication includes the information that indicates to switch the activated BWP from a non-dormant BWP of the serving cell to a dormant BWP. For example, the UE may deactivate the non-dormant BWP of the serving cell and activate the dormant BWP for the serving cell).

A UE may perform one or more of the following operations(s) (e.g., Operation (1) to Operation (5)) when a UE receives a PDCCH and/or DCI for BWP switching for a serving cell, and the PDCCH and/or DCI may include first information of a serving cell (e.g., a cell index) and/or second information of a dormant BWP (e.g., a BWP index for the dormant BWP), the UE may deactivate the non-dormant BWP of the serving cell and activate the dormant BWP for the serving cell.

A UE may perform one or more of the following operations(s) (e.g., Operation (1) to Operation (5)) when a UE receives an RRC (re-)configuration for BWP switching for a serving cell and the RRC (re-)configuration indicates to switch from a non-dormant BWP of the serving cell to a dormant BWP, the UE may deactivate the non-dormant BWP of the serving cell and activate the dormant BWP for the serving cell.

Operation (1) Flush (all) HARQ Buffers for the Serving Cell

If the activated BWP of a serving cell is switched from a non-dormant BWP to a dormant BWP, the UE may flush (all) HARQ buffers for the serving cell. If a BWP of a serving cell is activated, and the activated BWP is the dormant BWP, the UE may flush (all) HARQ buffers for the serving cell.

The UE may flush (all) HARQ buffers for a serving cell if the UE receives the dormancy indication (in the (DRX) Active Time and/or outside the (DRX) Active Time) for the serving cell (and/or for a dormancy group of the serving cell). The dormancy indication may include the information that indicates to switch the activated BWP of the serving cell from a non-dormant BWP to a dormant BWP. The UE may flush (all) HARQ buffers for all the serving cells in the dormancy group if the UE receives the dormancy indication for the dormancy group, where the dormancy indication may include information that indicates to switch the activated BWPs of all serving cells in the dormancy group from a non-dormant BWP to a dormant BWP.

If a UE receives a PDCCH and/or DCI for BWP switching for a serving cell, and the PDCCH and/or the DCI indicates to switch the activated BWP of the serving cell to a dormant BWP, the UE may flush (all) HARQ buffers for the serving cell. If a UE receives an RRC (re-)configuration for BWP switching for a serving cell and the RRC (re-)configuration indicates to switch the activated BWP of the serving cell to dormant BWP, the UE may flush (all) HARQ buffers for the serving cell.

Operation (2) Clear all PUSCH Resource(s) for Semi-Persistent CSI Reporting Associated with the SCell If the activated BWP of a serving cell is switched from a non-dormant BWP to a dormant BWP, the UE may clear all PUSCH resource(s) for semi-persistent CSI reporting associated with the serving cell. If a BWP of a serving cell is activated, and the activated BWP is the dormant BWP, the UE may clear all PUSCH resource(s) for semi-persistent CSI reporting associated with the serving cell.

The UE may clear all PUSCH resource(s) for semi-persistent CSI reporting associated with a serving cell if the UE receives the dormancy indication (in the (DRX) Active Time and/or outside the (DRX) Active Time) for the serving cell (and/or for a dormancy group of the serving cell). The dormancy indication may include information that indicates to switch the activated BWP of the serving cell from a non-dormant BWP to a dormant BWP. The UE may clear all PUSCH resource(s) for semi-persistent CSI reporting associated with all the serving cells in the dormancy group if the UE receives the dormancy indication for the dormancy group.

If a UE receives a PDCCH and/or DCI for BWP switching for a serving cell, and the PDCCH and/or the DCI indicates to switch the activated BWP of the serving cell to a dormant BWP, the UE may clear all PUSCH resource(s) for semi-persistent CSI reporting associated with the serving cell. If a UE receives an RRC (re-)configuration for BWP switching for a serving cell and the RRC (re-)configuration indicates to switch the activated BWP of the serving cell to a dormant BWP, the UE may clear all PUSCH resource(s) for semi-persistent CSI reporting associated with the serving cell.

Operation (3) (Re-)Start or Stop an SCell Deactivation Timer (e.g., sCellDeactivationTimer) Associated with the Serving Cell If the activated BWP of a serving cell is switched from a non-dormant BWP to a dormant BWP, the UE may (re-)start or stop an SCell Deactivation Timer (e.g., sCellDeactivationTimer) associated with the serving cell. If a BWP of a serving cell is activated, and the activated BWP is the dormant BWP, the UE may (re-)start or stop the sCellDeactivationTimer associated with the serving cell.

The UE may (re-)start or stop the sCellDeactivationTimer associated with a serving cell if the UE receives the dormancy indication (in the (DRX) Active Time and/or outside the (DRX) Active Time) for the serving cell (and/or for a dormancy group of the serving cell). The dormancy indication may include information that indicates to switch the activated BWP of the serving cell from a non-dormant BWP to a dormant BWP. The UE may (re-)start or stop the sCellDeactivationTimer associated with all the serving cell(s) in the dormancy group if the UE receives the dormancy indication for the dormancy group.

If a UE receives a PDCCH and/or DCI for BWP switching for a serving cell, and the PDCCH and/or the DCI indicates to switch the activated BWP of the serving cell to a dormant BWP, the UE may (re-)start or stop the sCellDeactivationTimer associated with the serving cell. If a UE receives an RRC (re-)configuration for BWP switching for a serving cell and the RRC (re-)configuration indicates to switch the activated BWP of the serving cell to a dormant BWP, the UE may (re-)start or stop the sCellDeactivationTimer associated with the serving cell.

Operation (4) (Re-)Start or Stop a BWP Inactivity Timer Associated with the Serving Cell If the activated BWP of a serving cell is switched from a non-dormant BWP to a dormant BWP, the UE may (re-)start or stop a BWP inactivity timer (e.g., bwp-InactiviTimer) associated with the serving cell. If a BWP of a serving cell is activated, and the activated BWP is the dormant BWP, the UE may (re-)start or stop the bwp-InactiviTimer associated with the serving cell.

The UE may (re-)start or stop the bwp-InactiviTimer associated with a serving cell if the UE receives the dormancy indication (in the (DRX) Active Time and/or outside the (DRX) Active Time) for the serving cell (and/or for a dormancy group of the serving cell). The dormancy indication may include information that indicates to switch the activated BWP of the serving cell from a non-dormant BWP to a dormant BWP. The UE may (re-)start or stop the bwp-InactiviTimer associated with all serving cells in a dormancy group if the UE receives the dormancy indication for the dormancy group.

If a UE receives a PDCCH and/or DCI for BWP switching for a serving cell, where the PDCCH and/or the DCI indicates to switch the activated BWP of the serving cell to a dormant BWP, the UE may (re-)start or stop the bwp-InactiviTimer associated with the serving cell. If a UE receives an RRC (re-)configuration for BWP switching for a serving cell and the RRC (re-)configuration indicates to switch the activated BWP of the serving cell to a dormant BWP, the UE may (re-)start or stop the bwp-InactiviTimer associated with the serving cell.

Operation (5) Stop/Abort/Terminate/Cancel an Ongoing RA/BFR/LBT/SR/BSR Procedure Initiated/Performed on/for the Serving Cell An ongoing procedure (e.g., an ongoing RA/BFR/LBT/SR/BSR procedure) may be a procedure that has been initiated/triggered but has not been stopped/aborted/terminated/canceled. The ongoing RA/BFR/LBT/SR/BSR procedure may be a procedure that is considered as pending/running by the UE.

If the activated BWP of a serving cell is switched from a non-dormant BWP to a dormant BWP, the UE may stop/abort/terminate/cancel the ongoing RA/BFR/LBT/SR/BSR procedure on/for the serving cell. Specifically, the UE may initiate/trigger a new RA/BFR/LBT/SR/BSR procedure on/for the serving cell after BWP switching.

If a BWP of a serving cell is activated, and the activated BWP is the dormant BWP, the UE may stop/abort/terminate/cancel the ongoing RA/BFR/LBT/SR/BSR procedure on/for the serving cell. Specifically, the UE may initiate/trigger a new RA/BFR/LBT/SR/BSR procedure on/for the serving cell after BWP switching.

The UE may stop/abort/terminate the ongoing RA procedure on/for the serving cell if the UE receives the dormancy indication (in the (DRX) Active Time and/or outside the (DRX) Active Time) for the serving cell (and/or for a dormancy group of the serving cell), where the dormancy indication may include information that indicates to switch the activated BWP of the serving cell from a non-dormant BWP to a dormant BWP. The UE may stop/abort/terminate/cancel the ongoing RA/BFR/LBT/SR/BSR procedure on/for the serving cell in the dormancy group if the UE receives the dormancy indication for the dormancy group. Specifically, the UE may initiate/trigger a new RA/BFR/LBT/SR/BSR procedure on/for the serving cell after BWP switching.

If a UE receives a PDCCH and/or DCI for BWP switching for a serving cell, where the PDCCH and/or the DCI indicates to switch the activated BWP of the serving cell to a dormant BWP, the UE may stop/abort/terminate/cancel the ongoing RA/BFR/LBT/SR/BSR procedure on/for the serving cell. Specifically, the UE may initiate/trigger a new RA/BFR/LBT/SR/BSR procedure on/for the serving cell after BWP switching.

If a UE receives an RRC (re-)configuration for BWP switching for a serving cell and the RRC (re-)configuration indicates to switch the activated BWP of the serving cell to dormant BWP, the UE may stop/abort/terminate/cancel the ongoing RA/BFR/LBT/SR/BSR procedure on/for the serving cell. Specifically, the UE may initiate/trigger a new RA/BFR/LBT/SR/BSR procedure on/for the serving cell after BWP switching.

A dormant BWP may be activated only on an activated serving cell, where the state of the activated serving cell may be an activation state. The UE may perform at least one of the operations (1) to (5) on the (activated) dormant BWP for the activated serving cell.

The present disclosure provides communication method(s) of performing Bandwidth Part (BWP) switching BWP switching between a dormant BWP and a non-dormant BWP. The communication method(s) is more flexible and better fits the requirements of different 5G scenarios (e.g., BWP switching/transition between a dormant BWP and a non-dormant BWP) than LTE.

Figure 2:
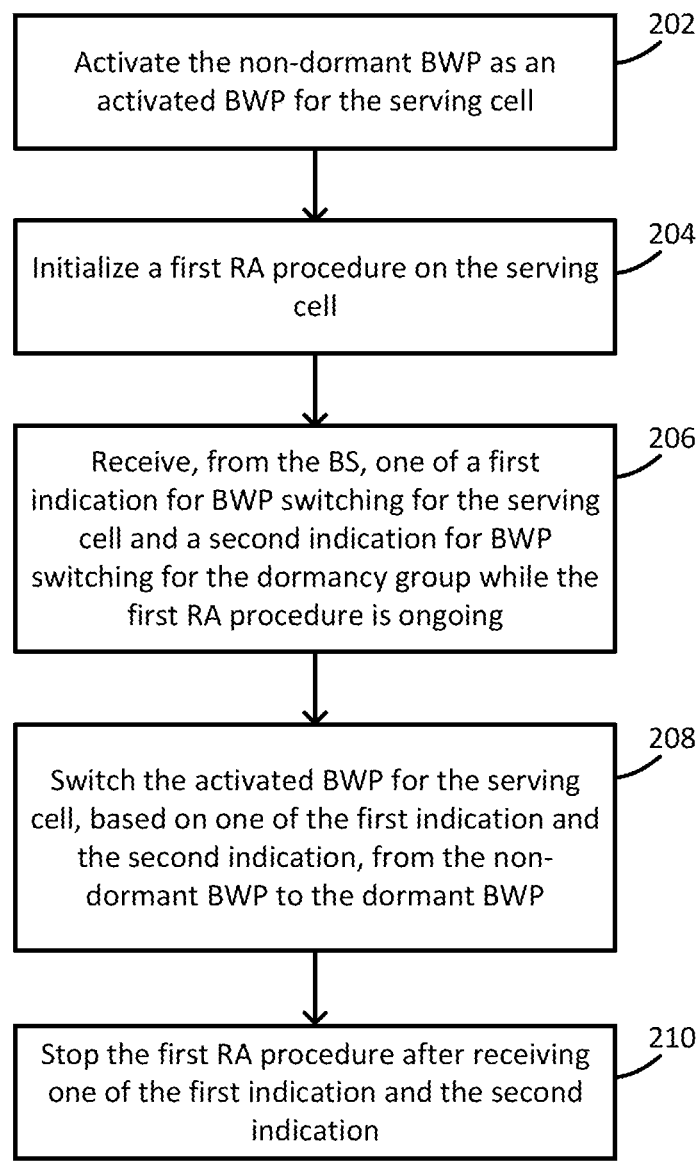
FIG. 2 illustrates a flowchart for a communication method of performing Bandwidth Part (BWP) switching between a non-dormant BWP and a dormant BW, according to an implementation of the present disclosure.

FIG. 2 illustrates a flowchart for a communication method 200 of performing Bandwidth Part (BWP) switching BWP switching between a non-dormant BWP and a dormant BWP, according to an implementation of the present disclosure. The communication method 200 may be performed by a UE configured (e.g., by a BS) with a serving cell and a dormancy group. The serving cell belongs to the dormancy group.

Although actions 202, 204, 206, 208 and 210 are delineated as separate actions represented as independent blocks in FIG. 2, these separately delineated actions should not be construed as necessarily order dependent. The order in which the actions are performed in FIG. 2 is not intended to be construed as a limitation, and any number of the disclosed blocks may be combined in any order to implement the method, or an alternate method. Moreover, one or more of the actions 202, 204, 206, 208, and 210 may be omitted in some of the present disclosure.

In action 202, the UE may activate the non-dormant BWP for the serving cell as an activated BWP for the serving cell.

In action 204, the UE may initialize a first RA procedure on the serving cell. The initialization of an RA procedure (e.g., the first RA procedure) may be specified in 3GPP 38.321 V15.7.0, section 5.1.1, "Random Access procedure initialization."

In action 206, the UE may receive, from the BS, one of a first indication for BWP switching for the serving cell and a second indication for BWP switching for the dormancy group while the first RA procedure is ongoing. The first/second indication for BWP switching may be transmitted via L1 signaling (e.g., a BWP switch indication included in DCI) or other higher layer signaling such as MAC CE signaling and/or RRC signaling.

The first indication for BWP switching may include a BWP ID and may instruct the UE to switch the current activated BWP to a BWP indicated by the BWP ID of the serving cell. The second indication for BWP switching may include a bitmap where each bit in the bitmap corresponds to a dormancy group with an example of the second indication for BWP switching provided in FIG. 6 (e.g., the indication 620).

In action 208, the UE may switch the activated BWP for the serving cell, based on one of the first indication and the second indication, from the non-dormant BWP to the dormant BWP. In action 210, the UE may stop the first RA procedure after receiving one of the first indication and the second indication.

The second indication may include a bit. When the bit is set to a first binary value (e.g., "0"), the UE may be instructed to switch the activated BWP for the serving cell from the non-dormant BWP to the dormant BWP and when the bit is set to a second binary value (e.g., "1"), the UE may be instructed to switch the activated BWP for the serving cell from the dormant BWP to the non-dormant BWP.

The second indication (for BWP switching) may be received by the UE via a PDCCH, and may be included in DCI scrambled by a PS-RNTI, DCI with format 0_1, or DCI with format 1_1. The first indication (for BWP switching) may be included in an RRC reconfiguration message for BWP switching for the serving cell.

The serving cell may be an SCell. The non-dormant BWP and the dormant BWP may be DL BWPs. The UE may only perform DL reception on the DL BWPs.

Figure 3:
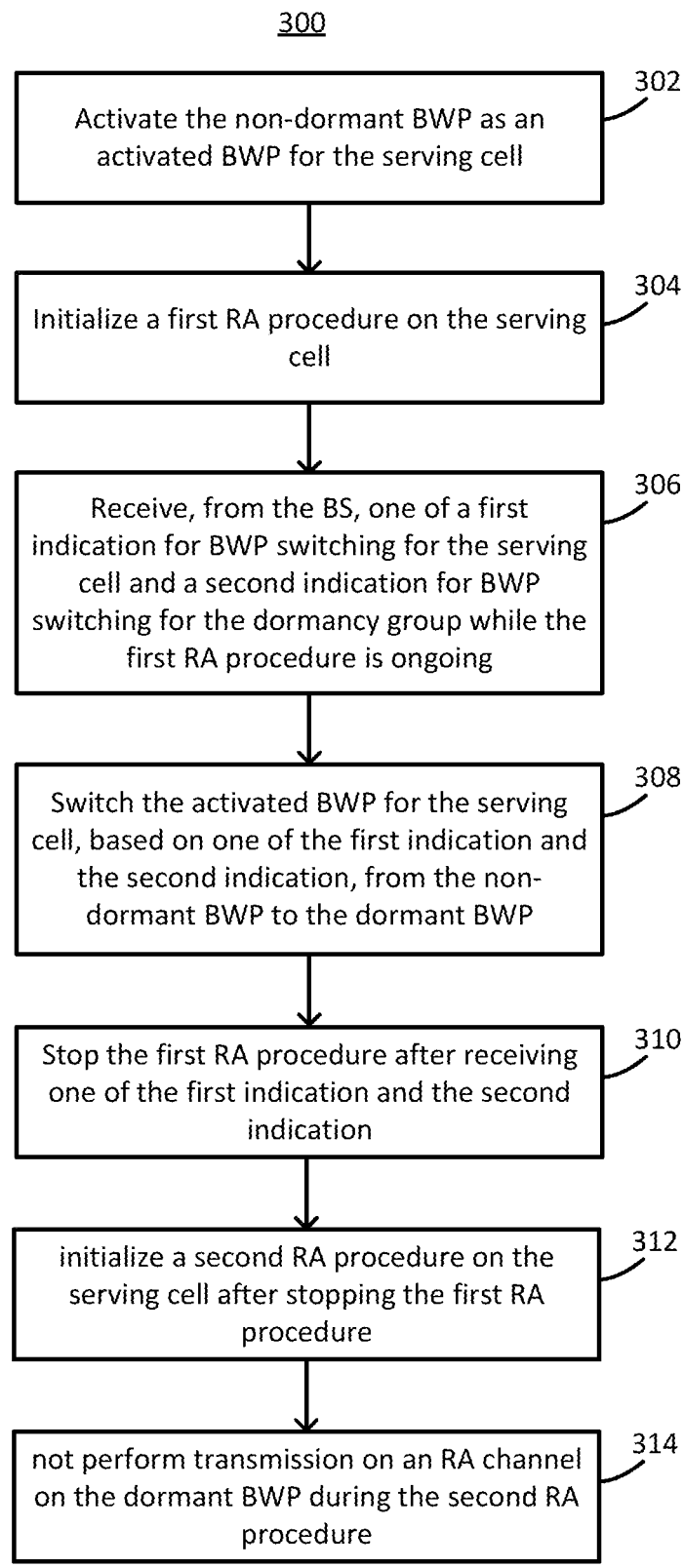
FIG. 3 illustrates a flowchart for a communication method of performing Bandwidth Part (BWP) switching between a non-dormant BWP and a dormant BWP, according to an implementation of the present disclosure.

FIG. 3 illustrates a flowchart for a communication method 300 of performing BWP switching between a non-dormant BWP and a dormant BWP, according to an implementation of the present disclosure. The communication method 300 may be performed by a UE configured (e.g., configured by a BS) with a serving cell and a dormancy group. The serving cell belongs to the dormancy group. The method 300 may include actions 302, 304, 306, 308,310, 312, and 314 which may correspond to actions 202, 204, 206, 208, and 210 illustrated in FIG. 2, respectively.

As illustrated in FIG. 3, in action 302, the UE may activate the non-dormant BWP for the serving cell as an activated BWP for the serving cell.

In action 304, the UE may initialize a first RA procedure on the serving cell.

In action 306, the UE may receive, from the BS, one of a first indication for BWP switching for the serving cell and a second indication for BWP switching for the dormancy group while the first RA procedure is ongoing.

In action 308, the UE may switch the activated BWP for the serving cell, based on one of the first indication and the second indication, from the non-dormant BWP to the dormant BWP.

In action 310, the UE may stop the first RA procedure after receiving one of the first indication and the second indication.

In action 312, the UE may initialize a second RA procedure on the serving cell after stopping the first RA procedure. The initialization of the second RA procedure may be specified in 3GPP 38.321 V15.7.0, section 5.1.1, "Random Access procedure initialization."

In action 314, the UE may not perform transmission on an RA channel on the dormant BWP during the second RA procedure.

Figure 4:
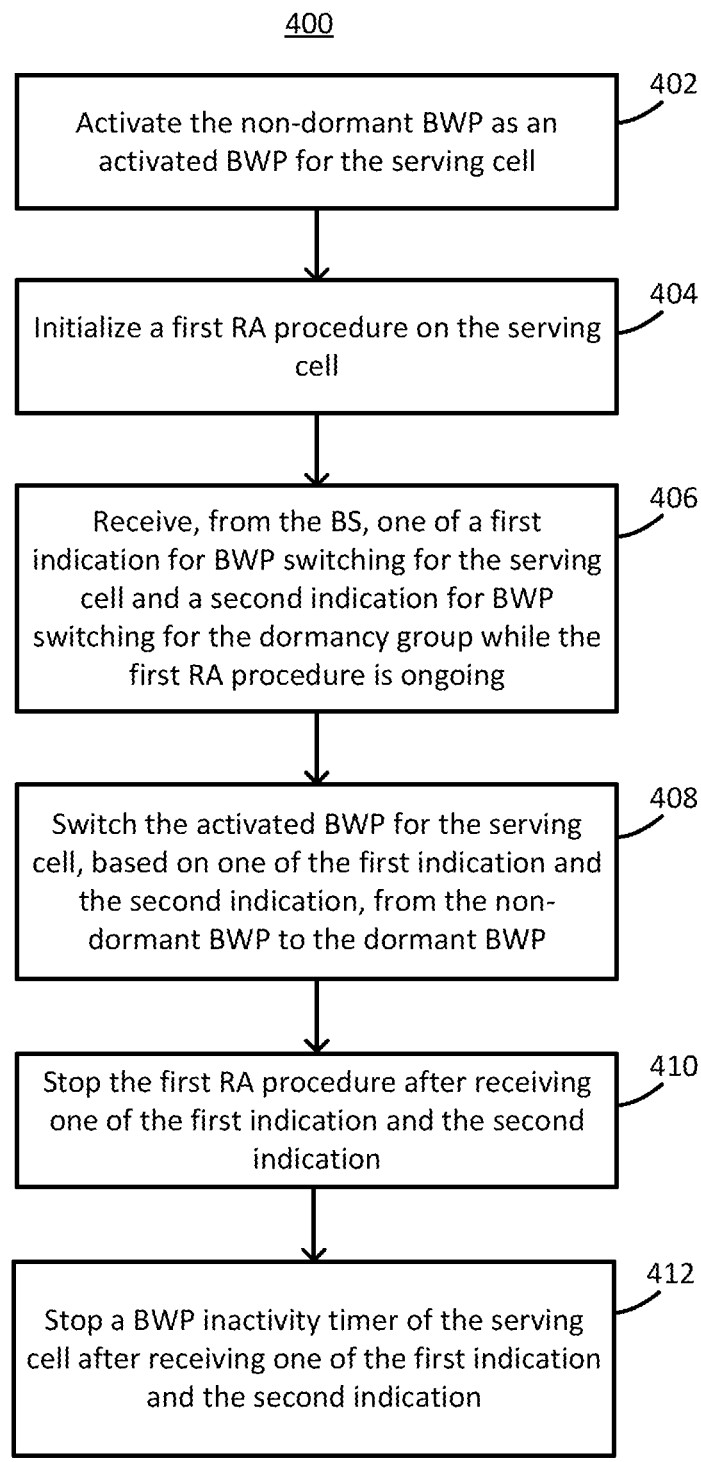
FIG. 4 illustrates a flowchart for a communication method of performing Bandwidth Part (BWP) switching between a non-dormant BWP and a dormant BWP, according to an implementation of the present disclosure.

FIG. 4 illustrates a flowchart for a communication method 400 of performing BWP switching between a non-dormant BWP and a dormant BWP, according to an implementation of the present disclosure. The communication method 400 may be performed by a UE configured (e.g., configured by a BS) with a serving cell and a dormancy group. The serving cell belongs to the dormancy group. The method 400 may include actions 402, 404, 406, 408,410, and 412 which may correspond to actions 202, 204, 206, 208, and 210 illustrated in FIG. 2, respectively.

As illustrated in FIG. 4, in action 402, the UE may activate the non-dormant BWP for the serving cell as an activated BWP for the serving cell.

In action 404, the UE may initialize a first RA procedure on the serving cell.

In action 406, the UE may receive, from the BS, one of a first indication for BWP switching for the serving cell and a second indication for BWP switching for the dormancy group while the first RA procedure is ongoing.

In action 408, the UE may switch the activated BWP for the serving cell, based on one of the first indication and the second indication, from the non-dormant BWP to the dormant BWP.

In action 410, the UE may stop the first RA procedure after receiving one of the first indication and the second indication.

In action 412, the UE may stop a BWP inactivity timer of the serving cell after receiving one of the first indication and the second indication.

Methods 200, 300, 400, or a combination thereof may be performed. For example, the UE may perform at least one of actions 310, 312, and 314 (illustrated in flowchart 300 of FIG. 3) and at least one of actions 410 and 412 (illustrated in flowchart 400 of FIG. 4) after action 208 is performed.

As disclosed previously, when operating on a dormant BWP, the UE may disable/deactivate/stop PDCCH monitoring operations on (or for) a serving cell but keep performing CSI measurements for the serving cell.

Figure 5:
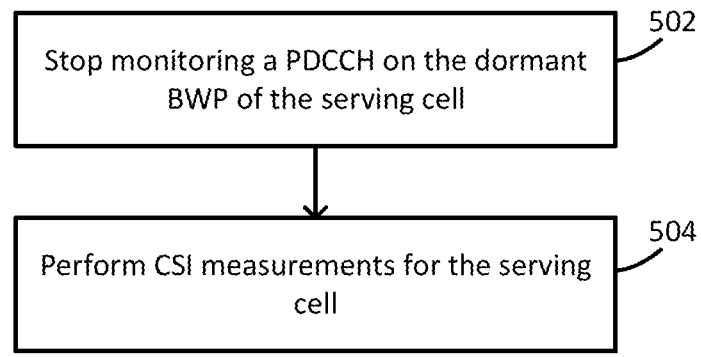
FIG. 5 illustrates a flowchart for the (dormancy) operations that a UE may perform on a dormant BWP of a serving cell, according to an implementation of the present disclosure.

FIG. 5 illustrates a flowchart for the (dormancy) operations that a UE may perform on a dormant BWP of a serving cell, according to an implementation of the present disclosure. As illustrated in FIG. 5, the (dormant) operations may include actions 502 and 504.

In action 502, the UE may stop monitoring a PDCCH on the dormant BWP of the serving cell.

In action 504, the UE may perform CSI measurements for the serving cell. For example, the UE may perform periodic or semi-persistent CSI measurements for the dormant BWP of the serving cell, if configured.

Actions 502 and 504 in FIG. 5 are merely an example. Additionally, or alternatively, the UE may have at least one of the following behaviors when operating on a dormant BWP of a serving cell:

the UE may stop monitoring a PDCCH for the dormant BWP of the serving cell.

the UE may not receive a DL-SCH on the dormant BWP of the serving cell.

the UE may not transmit on a UL-SCH on the dormant BWP of the serving cell.

the UE may not transmit on an RACH on the dormant BWP of the serving cell.

the UE may not transmit an SRS on the dormant BWP of the serving cell.

the UE may not transmit a PUCCH on the dormant BWP of the serving cell.

the UE may clear any configured downlink assignment and any configured uplink grant Type 2 associated with the serving cell.

the UE may suspend any configured uplink grant Type 1 associated with the serving cell.

the UE may perform beam failure detection and beam failure recovery for the serving cell if beam failure is detected.

Figure 6:
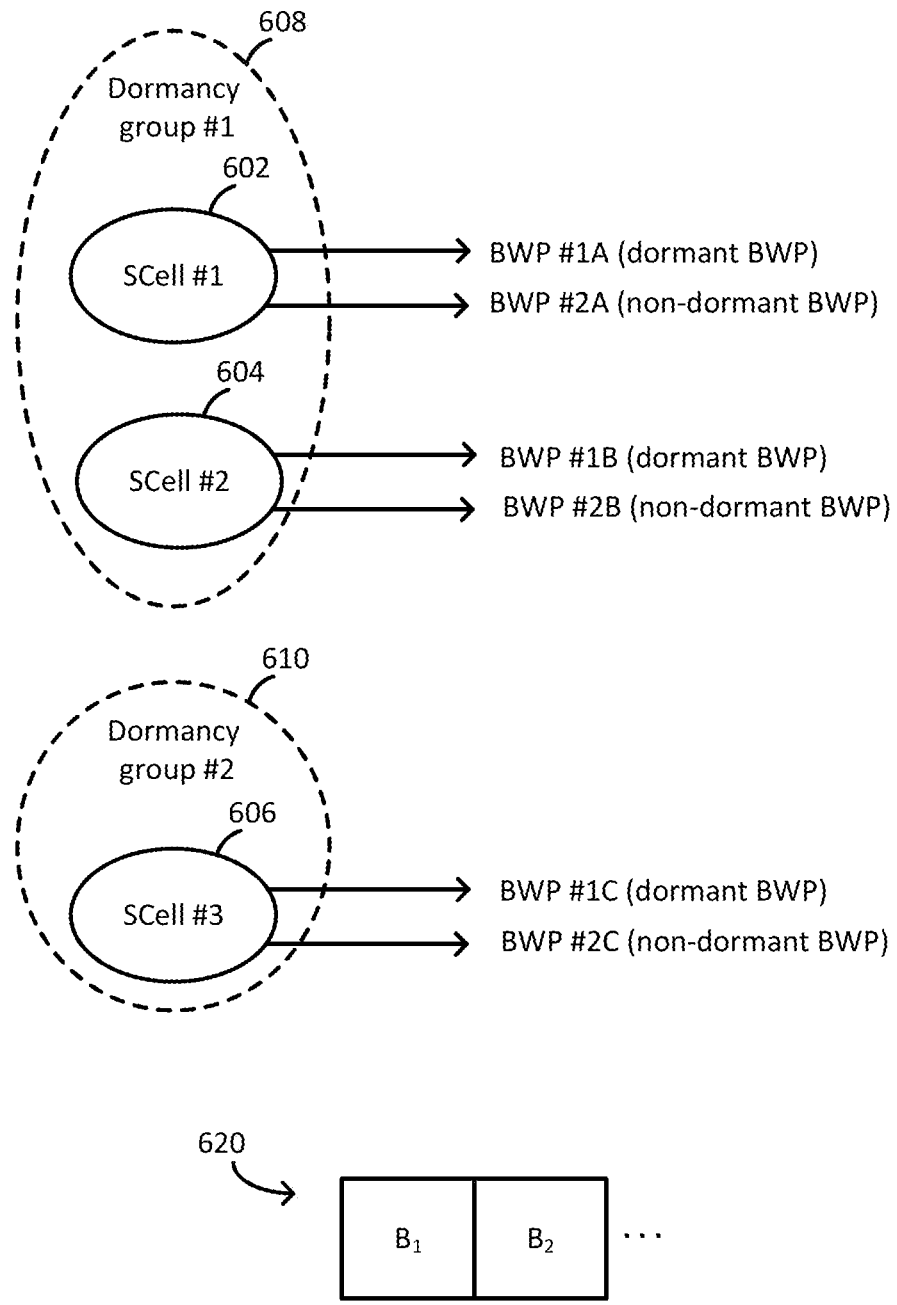
FIG. 6 illustrates correspondence between the SCell(s) in the dormancy groups and the dormant/non-dormant BWPs, according to an implementation of the present disclosure.

FIG. 6 illustrates correspondence between the SCell(s) in the dormancy groups and the dormant/non-dormant BWPs, according to an implementation of the present disclosure.

As illustrated in FIG. 6, the UE may be configured with multiple SCells (e.g., SCell #1 602, SCell #2 604, and SCell #3 606). The UE may receive a first RRC configuration indicating that SCell #1 602 and SCell #2 604 belong to the dormancy group #1 608, and SCell #3 606 belongs to the dormancy group #2 610.

The UE may also receive a second RRC configuration indicating a dormant BWP for an SCell of the UE. As illustrated in FIG. 6, the UE may receive a second RRC configuration indicating a BWP #1A (which is a dormant BWP) for the SCell #1 602. The UE may receive another second RRC configuration indicating a BWP #1B (which is a dormant BWP) for the SCell #2 604. The UE may receive another second RRC configuration indicating a BWP #1C (which is a dormant BWP) for the SCell #3 606.

The UE may also receive a third RRC configuration indicating a non-dormant BWP for an SCell of the UE. As illustrated in FIG. 6, the UE may receive a third RRC configuration indicating a BWP #2A (which is a non-dormant BWP) for the SCell #1 602. The UE may receive another third RRC configuration indicating a BWP #2B (which is a non-dormant BWP) for the SCell #2 604. The UE may receive another third RRC configuration indicating a BWP #2C (which is a non-dormant BWP) for the SCell #3 606.

When an SCell (or the dormancy group to which the SCell belongs) is indicated as a cell on which the UE needs to perform/activate dormant operations, the dormant BWP configured for the SCell may be activated as the active BWP, on which the dormant operations (e.g., actions 502 and 504 in FIG. 5) may be performed.

For example, when the SCell #1 602 is indicated as a cell on which the UE needs to perform the dormant operations, the BWP #1A may be activated as the active BWP of the SCell #1 602. When the dormancy group #1 608 is indicated as a dormancy group on which the UE needs to perform the dormant operations, the BWP #1A may be activated as the active BWP of the SCell #1 602 and the BWP #1B may be activated as the active BWP of the SCell #2 604. On the BWP #1A and/or the first BWP #1B, the UE may perform the dormant operations (e.g., performing CSI measurements but no PDCCH monitoring). Similarly, when the SCell #3 606 (or the dormancy group #2 610 including the SCell #3 606) is indicated as an SCell (or a dormancy group) on which the UE needs to perform the dormant operations, the BWP #1C may be activated as the active BWP of the SCell #3 606. The UE may perform the dormant operations on the BWP #1C.

When an SCell (or the dormancy group to which the SCell belongs) is indicated as a cell on which the UE does not need to perform the dormant operations, the non-dormant BWP configured for the SCell may be activated as the active BWP, on which the dormant operations may not be performed. For example, when the SCell #1 602 is indicated as a cell on which the UE does not need to perform the dormant operations, the BWP #2A may be activated as the active BWP of the SCell #1 602. When the dormancy group #1 608 is indicated as a dormancy group that the UE does not need to perform the dormant operations, the BWP #2A may be activated as the active BWP of the SCell #1 602 and the BWP #2B may be activated as the active BWP of the SCell #2 604. On the BWP #2A, the UE may not perform the dormant operations.

For example, the UE may perform PDCCH monitoring on the BWP #2A. Similarly, when the SCell #3 606 (or the dormancy group #2 610 including the SCell #3 606) is indicated as a cell (or a dormancy group) that UE does not need to perform the dormant operations, the BWP #2C may be activated as the active BWP of the SCell #3 606.

The dormancy indication may include a bitmap associated with at least one dormancy group. Each bit of the bitmap may correspond to one of the at least one dormancy group. As illustrated in FIG. 6, the indication 620 may include a bitmap including several bits (e.g., bit $B_1$, bit $B_2$, etc.), where bit $B_1$ may correspond to the dormancy group #1 608, and the bit $B_2$ may correspond to the dormancy group #2 610.

A '0' value for a bit of the bitmap of the dormancy indication may indicate that each activated SCell in the corresponding dormancy group enters dormant BWP (i.e., switch the activated BWP of each activated SCell of the dormancy group to a dormant BWP); A '1' value for a bit of the bitmap of the dormancy indication may indicate that each activated SCell in the corresponding dormancy group leaves dormant BWP (i.e., (i.e., switch the activated BWP of each activated SCell of the dormancy group to a non-dormant BWP).

The subsequent disclosure may be used to further elaborate the terms, examples, embodiments, actions, and/or behaviors disclosed previously:

UE: The UE may be referred to as a PHY/MAC/RLC/PDCP/SDAP entity. The PHY/MAC/RLC/PDCP/SDAP entity may refer to a UE.

Network: The network may be a network node, a TRP, a cell (e.g., SpCell, PCell, PSCell, and/or SCell), an eNB, a gNB, and/or a base station.

Serving Cell: A PCell, a PSCell, or an SCell. The serving cell may be an activated or a deactivated serving cell.

SpCell: For Dual Connectivity operation the term Special Cell refers to the PCell of the MCG or the PSCell of the SCG depending on if the MAC entity is associated with the MCG or the SCG, respectively. Otherwise, the term Special Cell refers to the PCell. A Special Cell supports PUCCH transmission and contention-based RA, and is always activated.

CC/Cell: The CC/Cell may be PCell, PSCell, and/or SCell.

UL-SCH resource: The UL-SCH resource may be RACH resource, PUCCH resource, and/or PUSCH resource. The UL-SCH resource may be scheduled by a dynamic grant (e.g., via PDCCH) and/or configured by RRC (e.g., type 1/type 2 configured UL grant or pre-configured in RRC configuration).

PSS: The PSS could be referred to as WUS, PDCCH-WUS, PDCCH-skipping, and/or go-to-sleep signaling. The PSS may be scrambled by a specific RNTI (e.g., PS-RNTI). The PSS may include one or more of the following information: Power saving technique associated with C-DRX (e.g., wake up and/or go to sleep), cross-slot scheduling, triggering RS transmission, CSI report, single/multi-cell operation, BWP information (e.g., BWP ID), SCell information (e.g., SCell ID) MIMO layer adaptation (e.g., the maximum number of MIMO layer), the number of antennas, an indication of CORESET/search space/candidate of subsequent PDCCH decoding, PDCCH monitoring periodicity, PDCCH skipping, skipping the number of DRX monitoring, SPS activation, DRX configuration, DRX cycle, etc. The monitoring occasion of PSS may be "indicated" to the UE by the NW with an offset before and or at the beginning (e.g., start symbol/slot/subframe) of DRX ON duration and "indicated" may imply the explicit signaling by higher layer signaling or implicit through the CORESET/search space.

For example, the NW may configure an offset to the UE. The NW may configure a specific CORESET and/or search space for PSS. The NW may configure a specific period for PSS, such that the period may be associated with the period of DRX cycle. The UE may monitor the PSS on the offset before and or at the beginning (e.g., start symbol/slot/subframe) of DRX ON duration on the specific CORESET and/or search space.

WUS: The WUS may or may not have a field to indicate the UE needs to wake up or not wake up. The UE receiving the WUS may imply that the NW instructs the UE to wake up (e.g., to monitor the PDCCH during the subsequent on duration (i.e., to star the drx-onDurationTimer at the beginning of the subsequent DRX cycle)). The UE not receiving the WUS on WUS occasion may imply that the NW instructs the UE to not wake up (e.g., not to monitor the PDCCH on the subsequent on duration (i.e., not to star the drx-onDurationTimer at the beginning of the subsequent DRX cycle)).

BFR: The term "BFR" may refer to a beam failure recovery procedure. The BFR procedure may be a PUCCH-based BFR procedure and/or a RACH-based BFR procedure.

RACH-based BFR procedure: The RACH-based BFR procedure may be performed based on the contention-free RA procedure and/or contention-based RA procedure.

The RACH-based BFR procedure is initiated when the corresponding RA procedure is initiated. The RACH-based BFR procedure is ongoing when the corresponding RA procedure is ongoing. The RACH-based BFR procedure is stopped when the corresponding RA procedure is stopped. The RACH-based BFR procedure is completed when the corresponding RA procedure is completed.

PUCCH-based BFR procedure: The PUCCH-based BFR procedure may be performed based on BFR-SR. The PUCCH-based BFR procedure is initiated when the corresponding BFR-SR is triggered. The PUCCH-based BFR procedure is ongoing when the corresponding BFR-SR is pending. The PUCCH-based BFR procedure is stopped when the corresponding BFR-SR is canceled.

LBT: The term "LBT" may be referred to as an LBT failure detection and recovery procedure to handle consistent LBT failure in the NR-U system. Based on this mechanism, a recovery procedure may be initiated by the UE upon one or more (consistent) UL LBT failure(s) in order to prevent further delay of UL transmission(s).

Details of BWP switch delay may be provided in 3GPP TS 38.133 V15.5.0. The actual timing to perform the previously disclosed behavior(s) may consider the BWP switch delay. For example, the UE may perform the previously disclosed behavior(s) before or after the BWP switch delay, such as when the UE receives the BWP switch indication.

Active BWP Switch Delay

The requirements in this section apply for a UE configured with more than one BWP on a PCell or any activated SCell in a standalone NR or NE-DC, PCell, PSCell, or any activated SCell in MCG or SCG in NR-DC, or PSCell or any activated SCell in SCG in EN-DC. The UE may complete the switching of active DL and/or UL BWP within the delay defined in this section.

DCI and Timer-based BWP Switch Delay

For DCI-based BWP switching, after the UE receives a BWP switching request in DL slot n on a serving cell, the UE may be able to receive a PDSCH (for DL active BWP switching) or transmit a PUSCH (for UL active BWP switching) on the new BWP on the serving cell on which BWP switching in the first DL or UL slot occurs right after the beginning of DL slot $n+T_{BWPswitchDelay}$.

The UE is not required to transmit UL signals or receive DL signals during time duration $T_{BWPswitchDelay}$ on the cell where DCI-based BWP switching occurs. The UE is not required to follow the requirements defined in this section when performing DCI-based BWP switching between the BWPs in non-overlapping channel bandwidths or in partially overlapping channel bandwidths.

For timer-based BWP switching, the UE may start BWP switching in DL slot n, where n is the beginning of a DL subframe (FR1) or a DL half-subframe (FR2) immediately after a BWP-inactivity timer bwp-InactivityTimer expires on a serving cell, and the UE may be able to receive a PDSCH (for DL active BWP switching) or transmit a PUSCH (for UL active BWP switching) on the new BWP in the serving cell in which BWP switching in the first DL or UL slot occurs right after the beginning of DL slot $n+T_{BWPswitchDelay}$.

The UE is not required to transmit UL signals or receive DL signals after the bwp-Inactivity Timer expires in the cell in which timer-based BWP switching occurs.

Depending on the UE capability bwp-SwitchingDelay, the UE may complete BWP switching within the time duration $T_{BWPswitchDelay}$ defined in Table 2.

TABLE 2

| | | BWP switch delay | |
|---|---|---|---|
| | NR Slot length | BWP Switch delay $T_{BWPswitchDelay}$ (slots) | |
| μ | (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switching involves changing the SCS, the BWP switch delay is determined by the larger of the SCS before BWP switching and the SCS after BWP switching.

RRC-based BWP Switch Delay

For RRC-based BWP switching, after the UE receives a BWP switching request, UE may be able to receive a PDSCH/PDCCH (for DL active BWP switching) or transmit a PUSCH (for UL active BWP switching) on the new BWP in the serving cell in which BWP switching occurs in the first DL or UL slot right after the beginning of DL slot $$n + \frac{T_{RRCprocessingDelay} + T_{BWPswitchDelayRRC}}{NR \text{ Slot length}},$$

where.

DL slot n is the last slot containing the RRC command, and $T_{RRCprocessingDelay}$ is the length of the RRC procedure delay in milliseconds as defined in clause 12 in TS 38.331 (e.g., as specified in 3GPP TS 36.321 V15.4.0), and $T_{BWPswitchDelayRRC}$=[6] ms is the time used by the UE to perform BWP switching.

The UE is not required to transmit UL signals or receive DL signals during the time defined by $T_{RRCprocessingDelay}$+$T_{BWPswitchDelayRRC}$ in the cell in which RRC-based BWP switching occurs.

Figure 7:
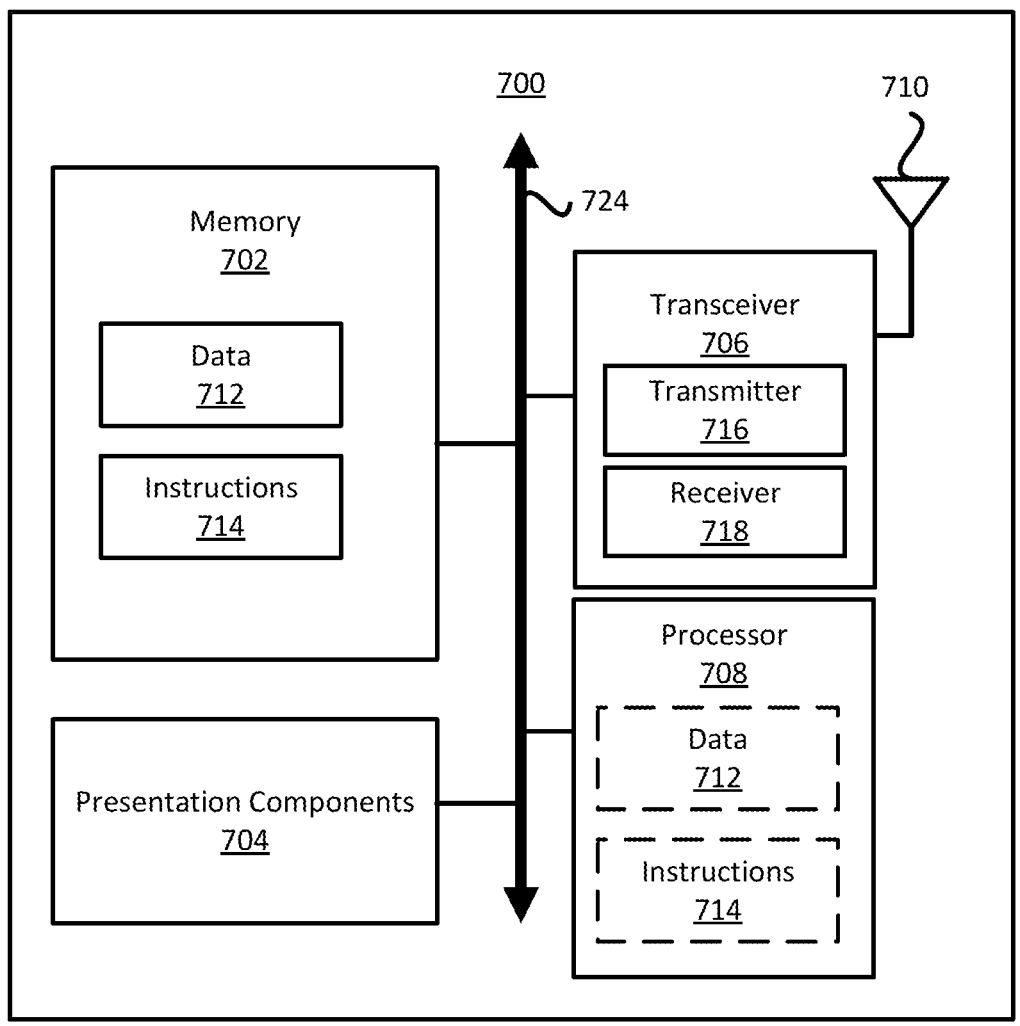
FIG. 7 illustrates a node for wireless communication, according to an implementation of the present disclosure.

FIG. 7 illustrates a node 700 for wireless communication, according to an implementation of the present disclosure. As illustrated in FIG. 7, the node 700 may include a transceiver 706, a processor 708, a memory 702, one or more presentation components 704, and at least one antenna 710. The node 700 may also include an RF spectrum band module, a BS communications module, a network communications module, and a system communications management module, Input/Output (I/O) ports, I/O components, and a power supply (not explicitly illustrated in FIG. 7). Each of these components may be in communication with each other, directly or indirectly, over one or more buses 724. The node 700 may be a UE or a BS that performs various functions described herein, for example, with reference to FIGS. 1 through 6.

The transceiver 706 has a transmitter 716 (e.g., transmitting/transmission circuitry) and a receiver 718 (e.g., receiving/reception circuitry) and may be configured to transmit and/or receive time and/or frequency resource partitioning information. The transceiver 706 may be configured to transmit in different types of subframes and slots, including, but not limited to, usable, non-usable and flexibly usable subframes and slot formats. The transceiver 706 may be configured to receive data and control channels.

The node 700 may include a variety of computer-readable media. Computer-readable media can be any available media that can be accessed by the node 700 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules, or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 702 may include computer storage media in the form of volatile and/or non-volatile memory. The memory 702 may be removable, non-removable, or a combination thereof. For example, the memory 702 may include solid-state memory, hard drives, optical-disc drives, etc. As illustrated in FIG. 7, the memory 702 may store computer-readable and/or computer-executable instructions 714 (e.g., software codes) that are configured to, when executed, cause the processor 708 to perform various functions described herein, for example, with reference to FIGS. 1 through 6. Alternatively, the instructions 714 may not be directly executable by the processor 708 but may be configured to cause the node 700 (e.g., when compiled and executed) to perform various functions described herein.

The processor 708 (e.g., having processing circuitry) may include an intelligent hardware device, a Central Processing Unit (CPU), a microcontroller, an ASIC, etc. The processor 708 may include memory. The processor 708 may process the data 712 and the instructions 714 received from the memory 702, and process information through the transceiver 706, the baseband communications module, and/or the network communications module. The processor 708 may also process information to be sent to the transceiver 706 for transmission through the antenna 710, to the network communications module for transmission to a CN.

One or more presentation components 704 may present data indications to a person or other devices. Examples of presentation components 704 may include a display device, speaker, printing component, vibrating component, etc.

From the present disclosure, it is manifested that various techniques may be used for implementing the disclosed concepts without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A communication method of performing Bandwidth Part (BWP) switching between a non-dormant BWP and a dormant BWP, the communication method performed by a User Equipment (UE) configured by a Base Station (BS) with a serving cell and a dormancy group to which the serving cell belongs, the communication method comprising:

activating the non-dormant BWP as an activated BWP for the serving cell;
initializing a first Random Access (RA) procedure on the serving cell;
receiving, from the BS, one of a first indication for BWP switching for the serving cell and a second indication for BWP switching for the dormancy group while the first RA procedure is ongoing;
switching the activated BWP for the serving cell, based on the one of the first indication and the second indication, from the non-dormant BWP to the dormant BWP;
stopping the first RA procedure after receiving the one of the first indication and the second indication;
initializing a second RA procedure on the serving cell after stopping the first RA procedure; and
not performing transmission on an RA channel on the dormant BWP during the second RA procedure.

2. The communication method of claim 1, further comprising:
stopping a BWP inactivity timer of the serving cell after receiving the one of the first indication and the second indication.

3. The communication method of claim 1, further comprising:
performing operations on the dormant BWP, the operations including:
stopping monitoring a Physical Downlink Control Channel (PDCCH) on the serving cell; and
performing Channel State Information (CSI) measurements for the serving cell.

4. The communication method of claim 1, wherein:
the second indication includes a bit;
the UE is instructed to switch the activated BWP for the serving cell from the non-dormant BWP to the dormant BWP when the bit is set to a first binary value; and
the UE is instructed to switch the activated BWP for the serving cell from the dormant BWP to the non-dormant BWP when the bit is set to a second binary value.

5. The communication method of claim 1, wherein:
the second indication is received via a Physical Downlink Control Channel (PDCCH); and
the second indication is included in one of Downlink Control Information (DCI) scrambled by a Power Saving Radio Network Temporary Identity (PS-RNTI), DCI with format 0_1, and DCI with format 1_1.

6. The communication method of claim 1, wherein the first indication is received, via a Physical Downlink Control Channel (PDCCH) or via a Radio Resource Control (RRC) reconfiguration message, for BWP switching for the serving cell.

7. The communication method of claim 1, wherein the second indication includes a bitmap associated with at least one dormancy group, each bit of the bitmap corresponding to one of the at least one dormancy group.

8. The communication method of claim 1, wherein the serving cell is a Secondary Cell (SCell).

9. The communication method of claim 1, wherein the non-dormant BWP and the dormant BWP are Downlink (DL) BWPs.

10. A User Equipment (UE) of performing Bandwidth Part (BWP) switching between a non-dormant BWP and a dormant BWP, the UE configured by a Base Station (BS) with a serving cell and a dormancy group to which the serving cell belongs, the UE comprising:

a processor; and
a memory coupled to the processor, wherein the memory stores at least one computer-executable program that, when executed by the processor, causes the UE to:
activate the non-dormant BWP as an activated BWP for the serving cell;
initialize a first Random Access (RA) procedure on the serving cell;
receive, from the BS, one of a first indication for BWP switching for the serving cell and a second indication for BWP switching for the dormancy group while the first RA procedure is ongoing;
switch the activated BWP for the serving cell, based on the one of the first indication and the second indication, from the non-dormant BWP to the dormant BWP;
stop the first RA procedure after receiving the one of the first indication and the second indication;
initialize a second RA procedure on the serving cell after stopping the first RA procedure; and
not perform transmission on an RA channel on the dormant BWP during the second RA procedure.

11. The UE of claim 10, wherein when the at least one computer-executable program is executed by the processor, the at least one computer-executable program further causes the UE to:
stop a BWP inactivity timer of the serving cell after receiving the one of the first indication and the second indication.

12. The UE of claim 10, wherein when the at least one computer-executable program is executed by the processor, the at least one computer-executable program further causes the UE to:
perform operations on the dormant BWP, the operations including:
stopping monitoring a Physical Downlink Control Channel (PDCCH) on the serving cell; and
performing Channel State Information (CSI) measurements for the serving cell.

13. The UE of claim 10, wherein:
the second indication includes a bit;
the UE is instructed to switch the activated BWP for the serving cell from the non-dormant BWP to the dormant BWP when the bit is set to a first binary value; and
the UE is instructed to switch the activated BWP for the serving cell from the dormant BWP to the non-dormant BWP when the bit is set to a second binary value.

14. The UE of claim 10, wherein:
the second indication is received via a Physical Downlink Control Channel (PDCCH); and
the second indication is included in one of Downlink Control Information (DCI) scrambled by a Power Saving Radio Network Temporary Identity (PS-RNTI), DCI with format 0_1, and DCI with format 1_1.

15. The UE of claim 10, wherein the first indication is received, via a Physical Downlink Control Channel (PDCCH) or via a Radio Resource Control (RRC) reconfiguration message, for BWP switching for the serving cell.

16. The UE of claim 10, wherein the second indication includes a bitmap associated with at least one dormancy group, each bit of the bitmap corresponding to one of the at least one dormancy group.

17. The UE of claim 10, wherein the serving cell is a Secondary Cell (SCell).

18. The UE of claim 10, wherein the non-dormant BWP and the dormant BWP are Downlink (DL) BWPs.

* * * * *